Patented Feb. 21, 1939

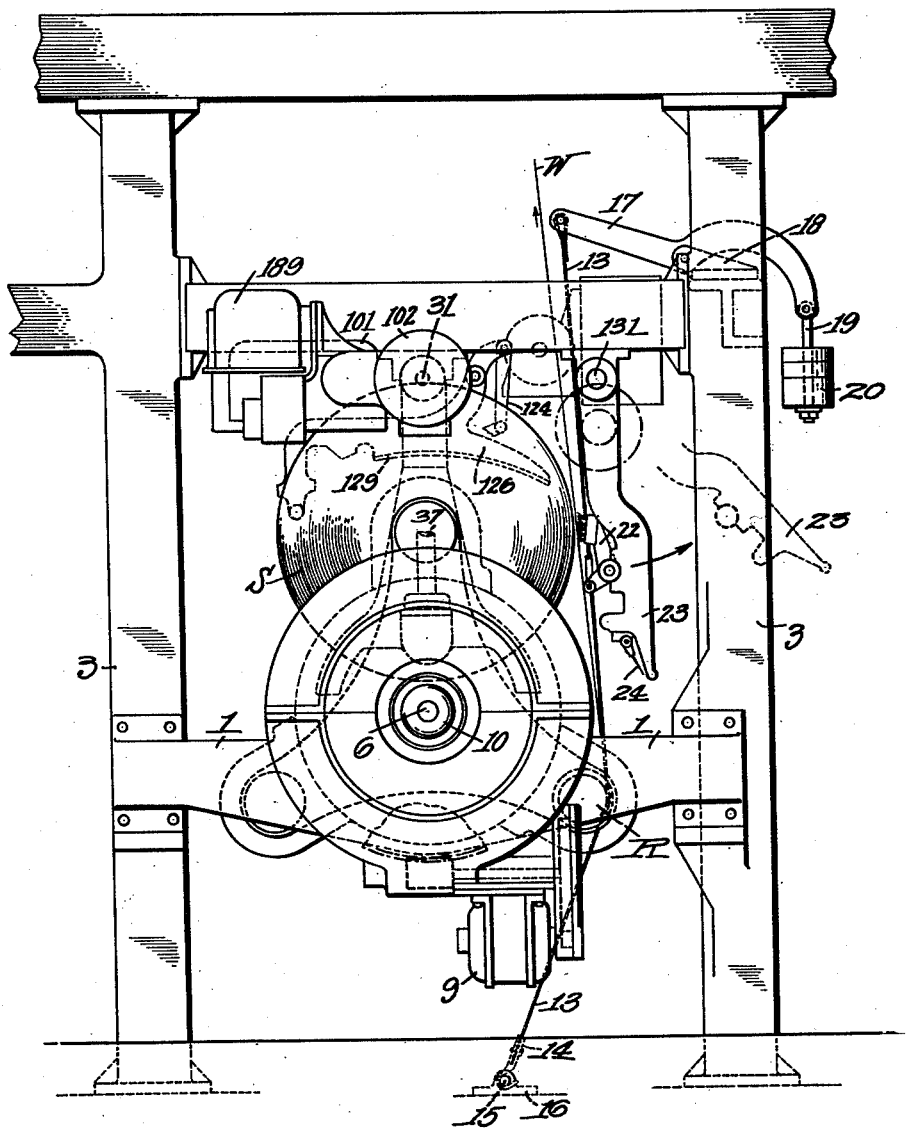

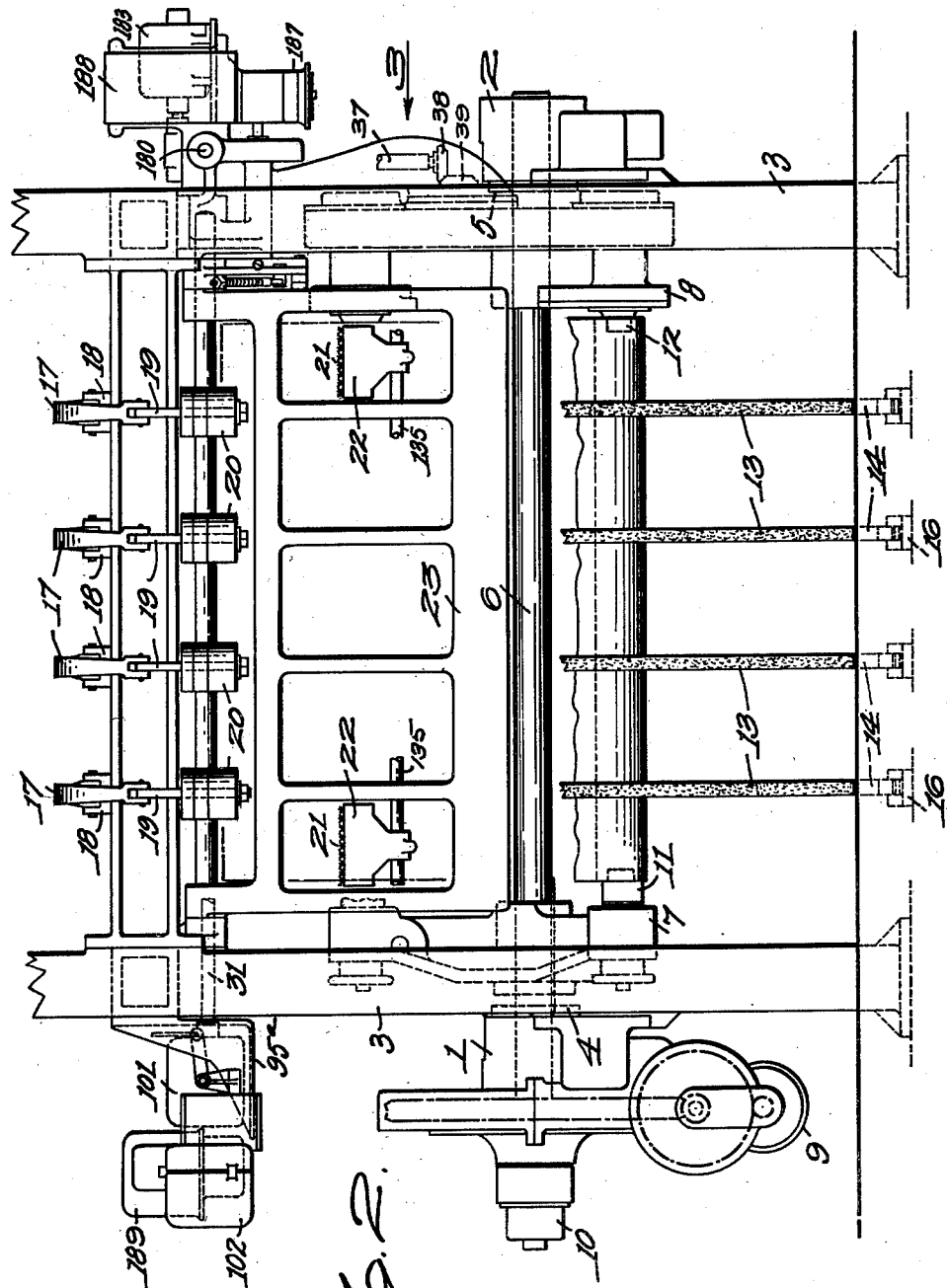

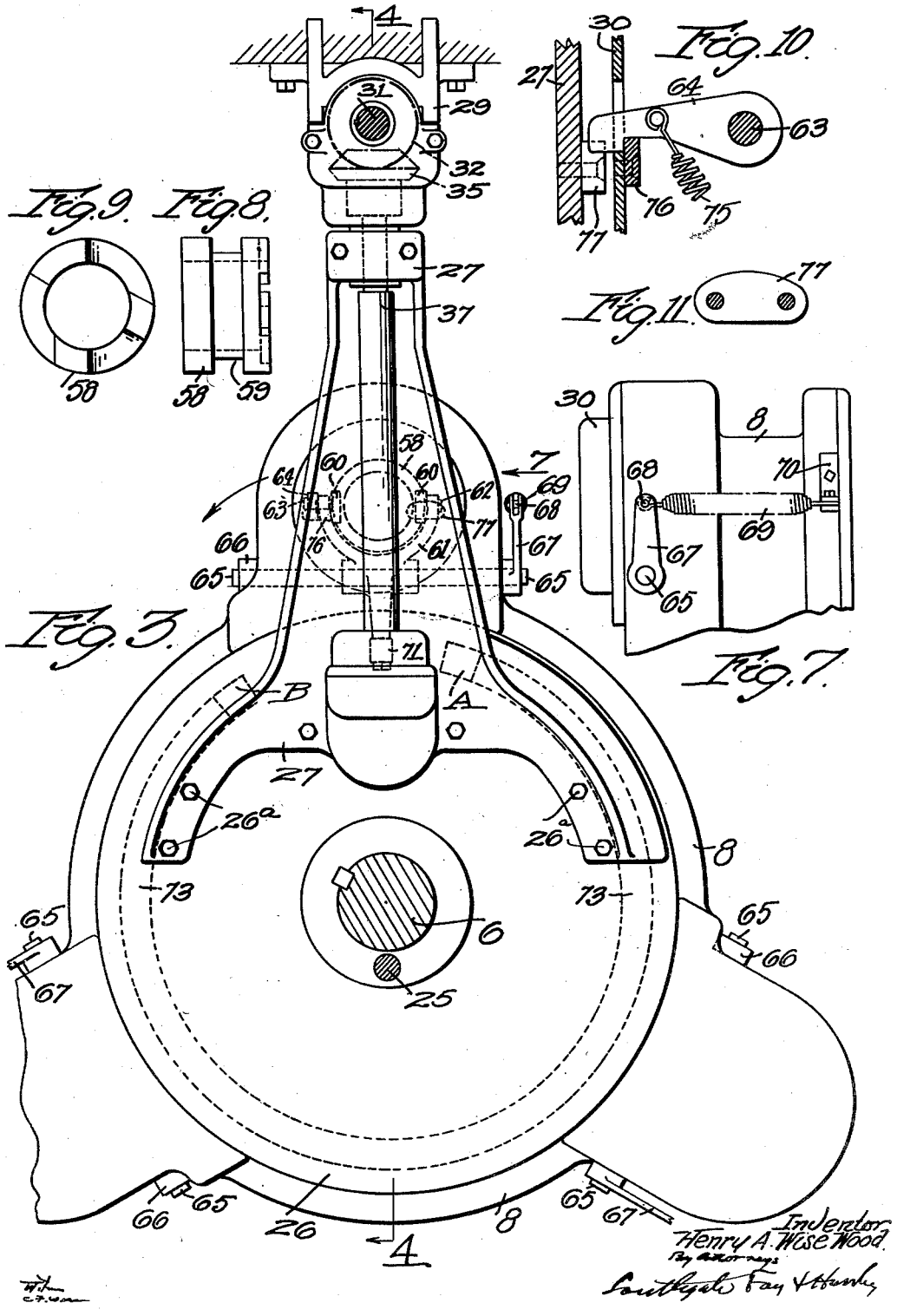

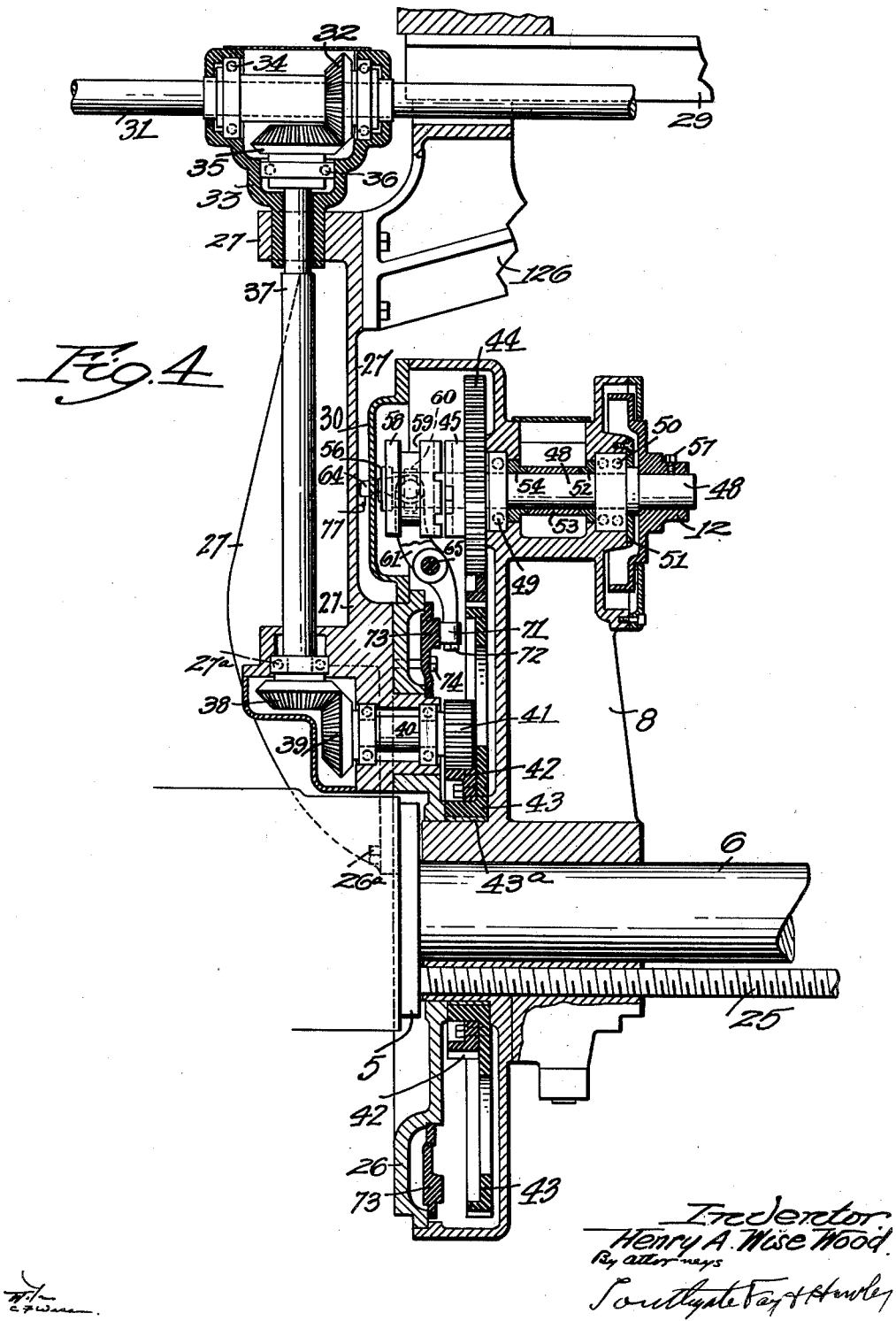

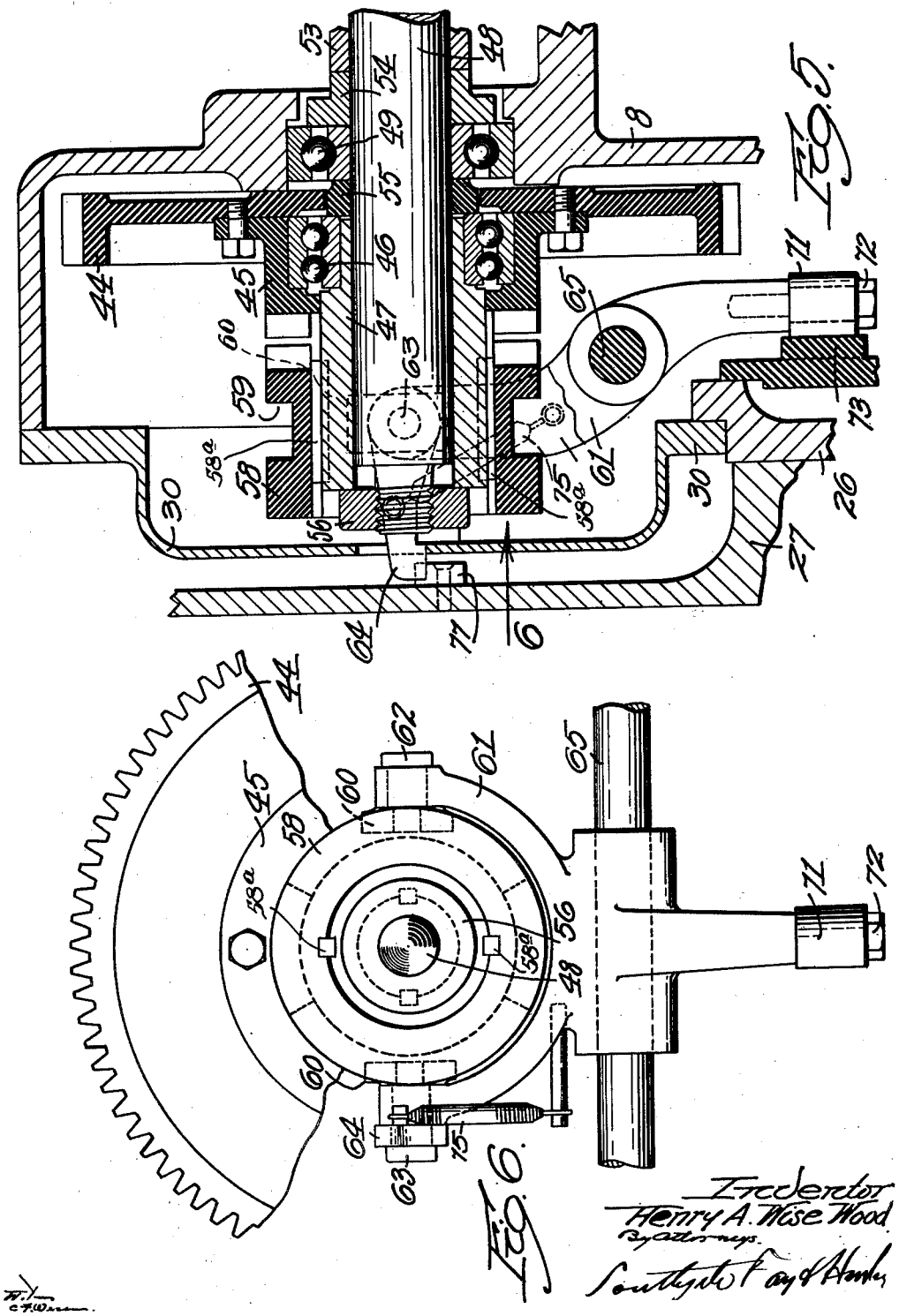

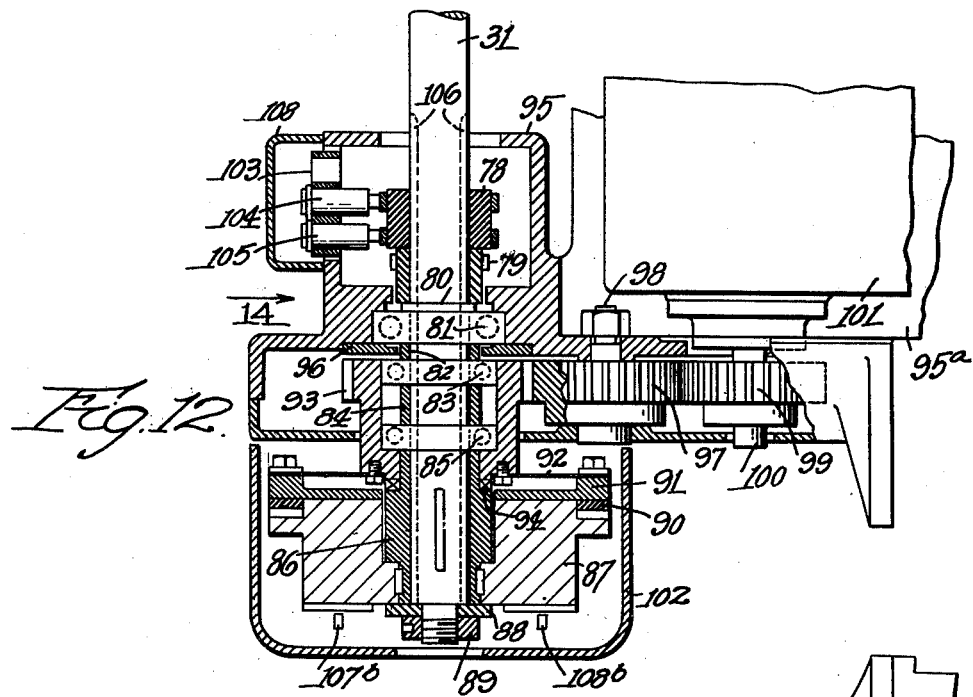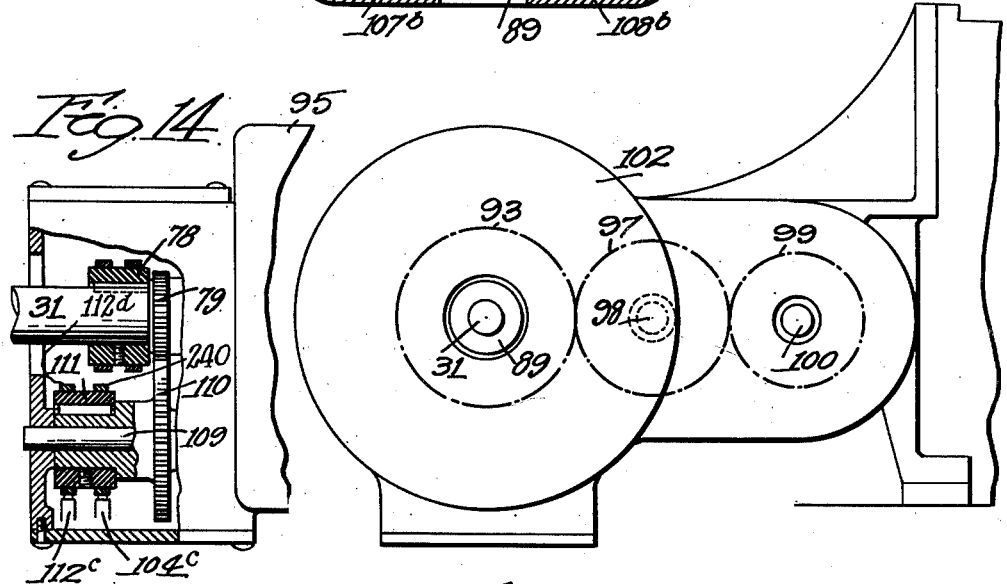

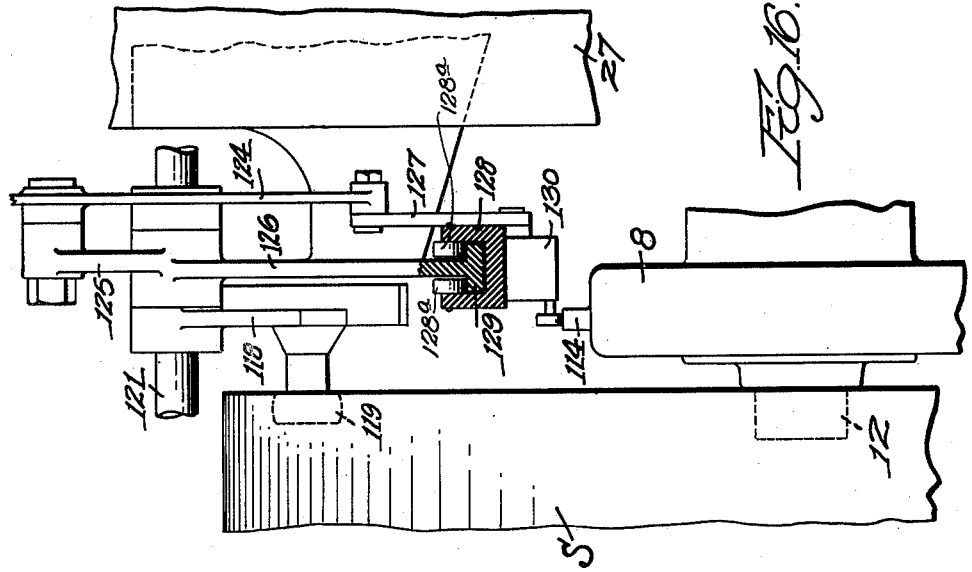
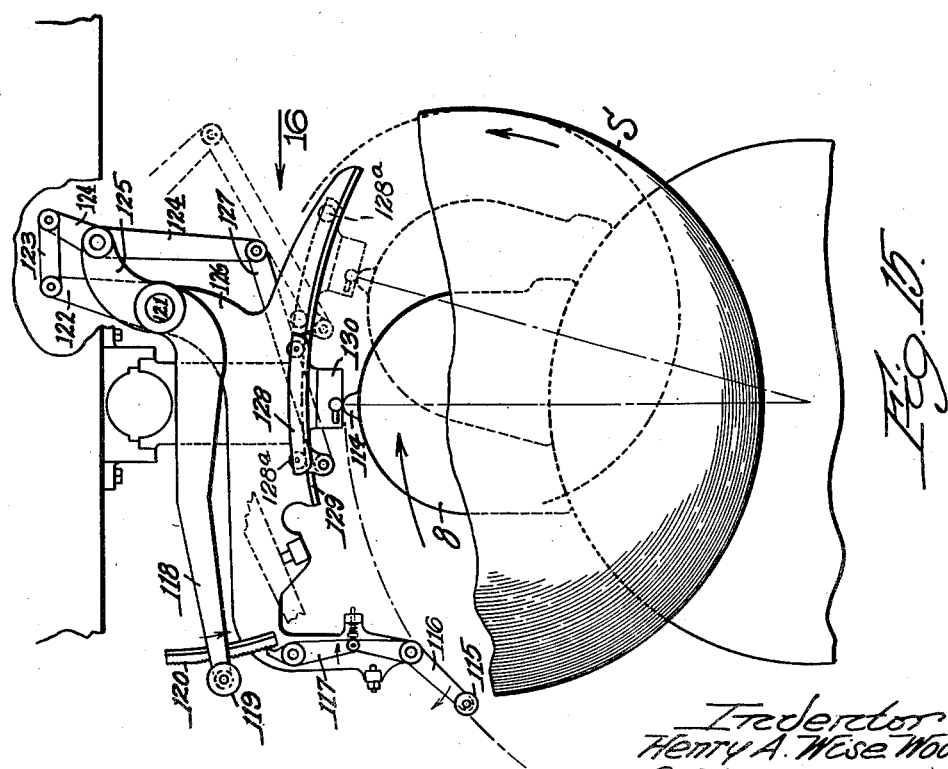

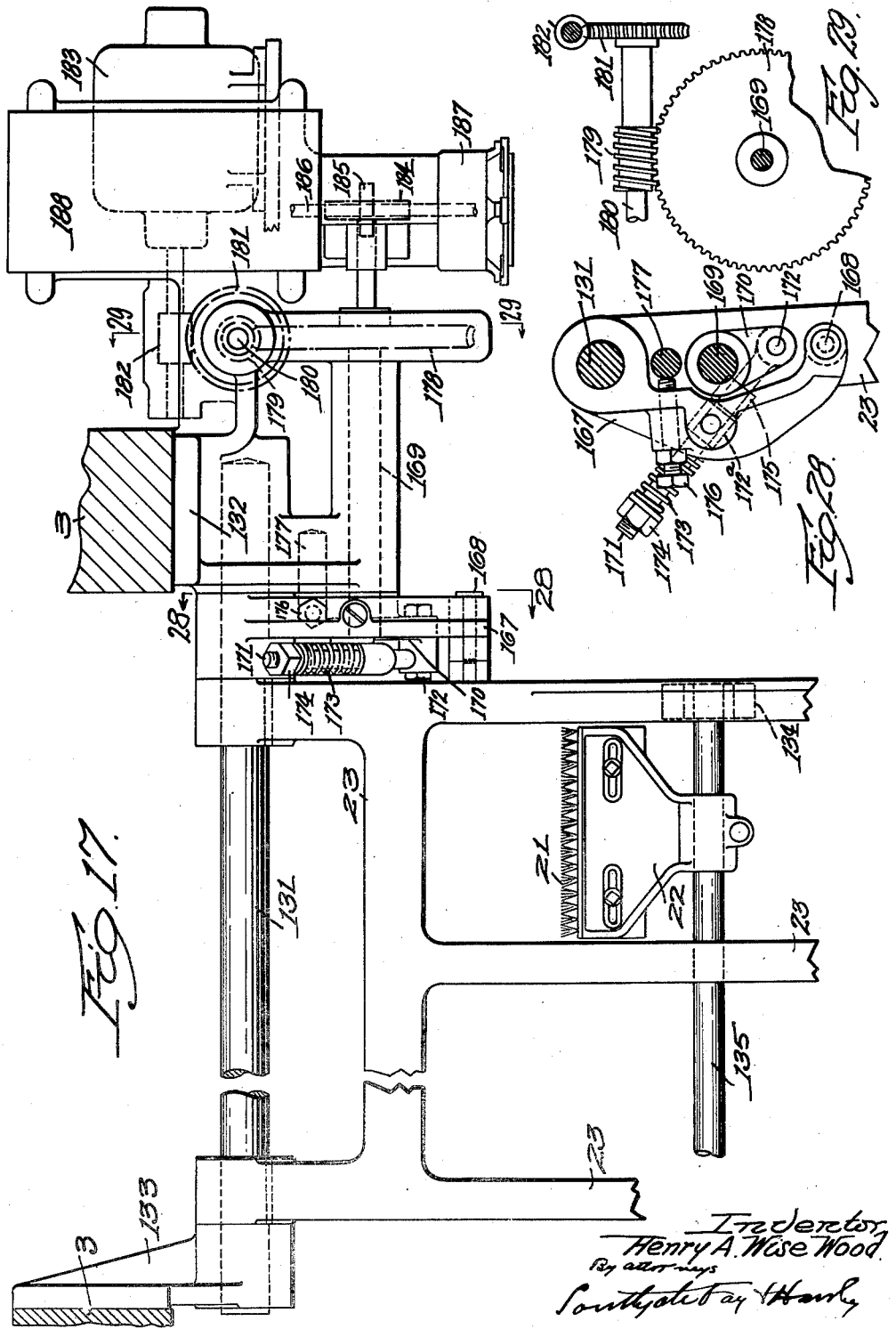

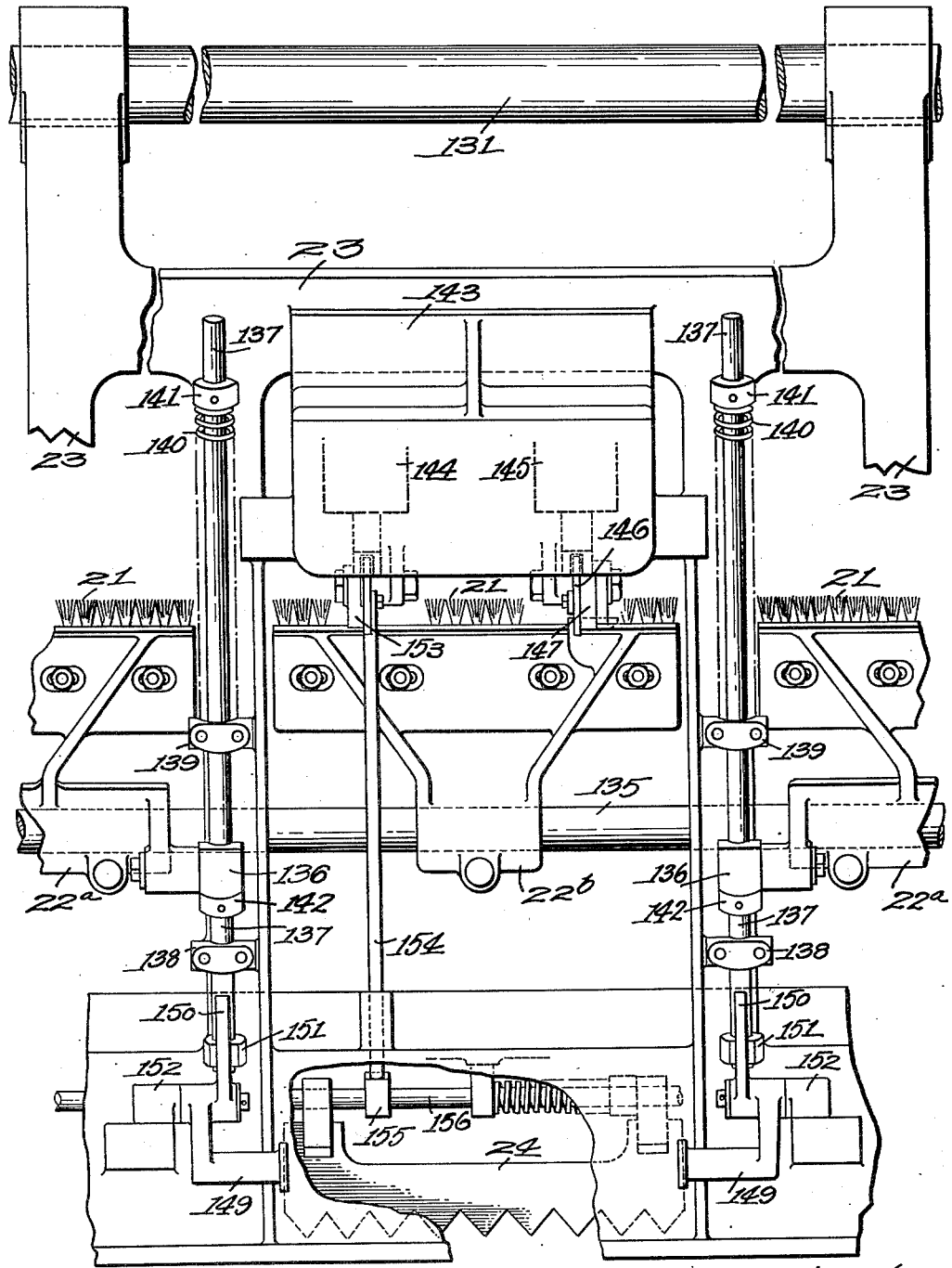

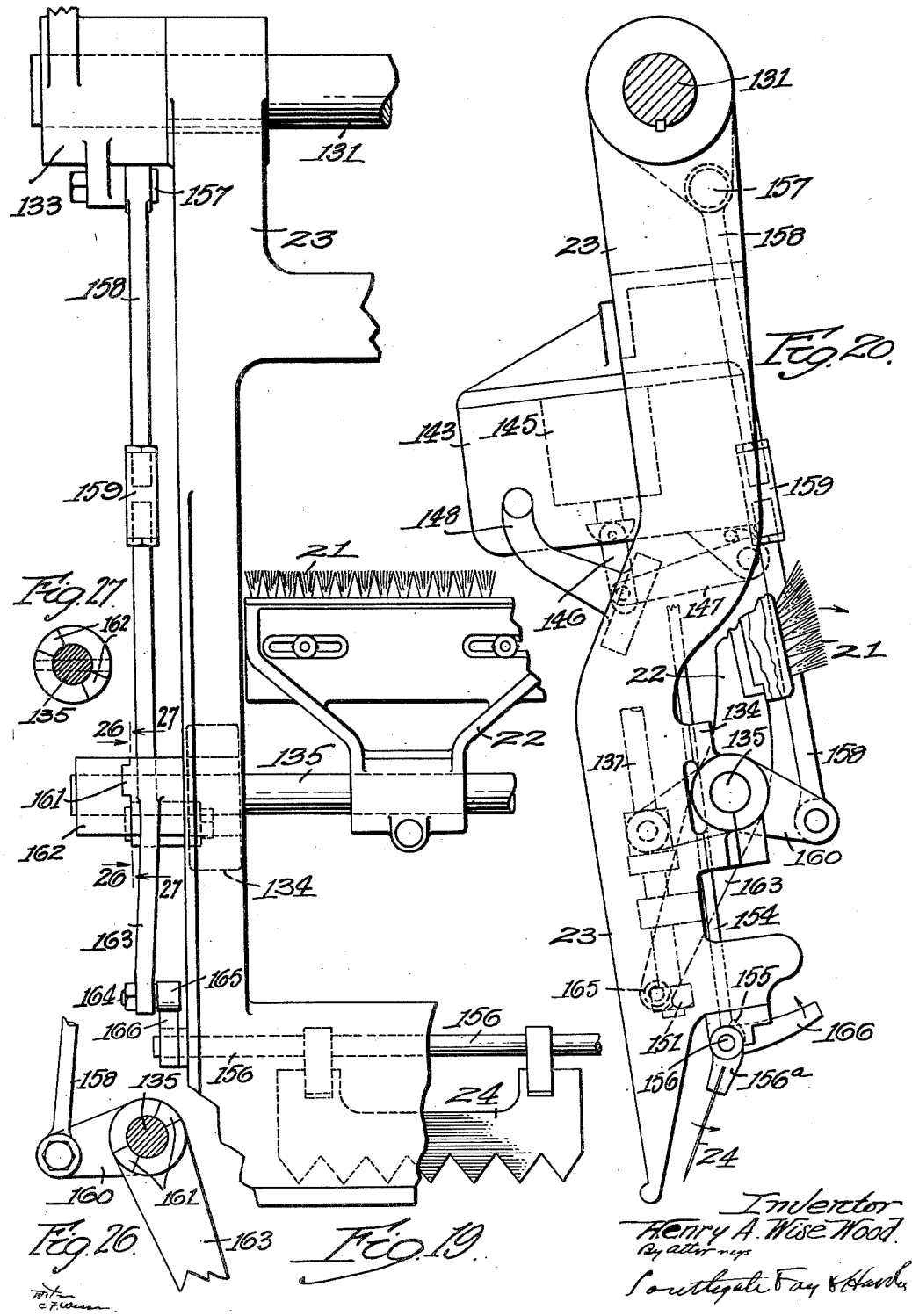

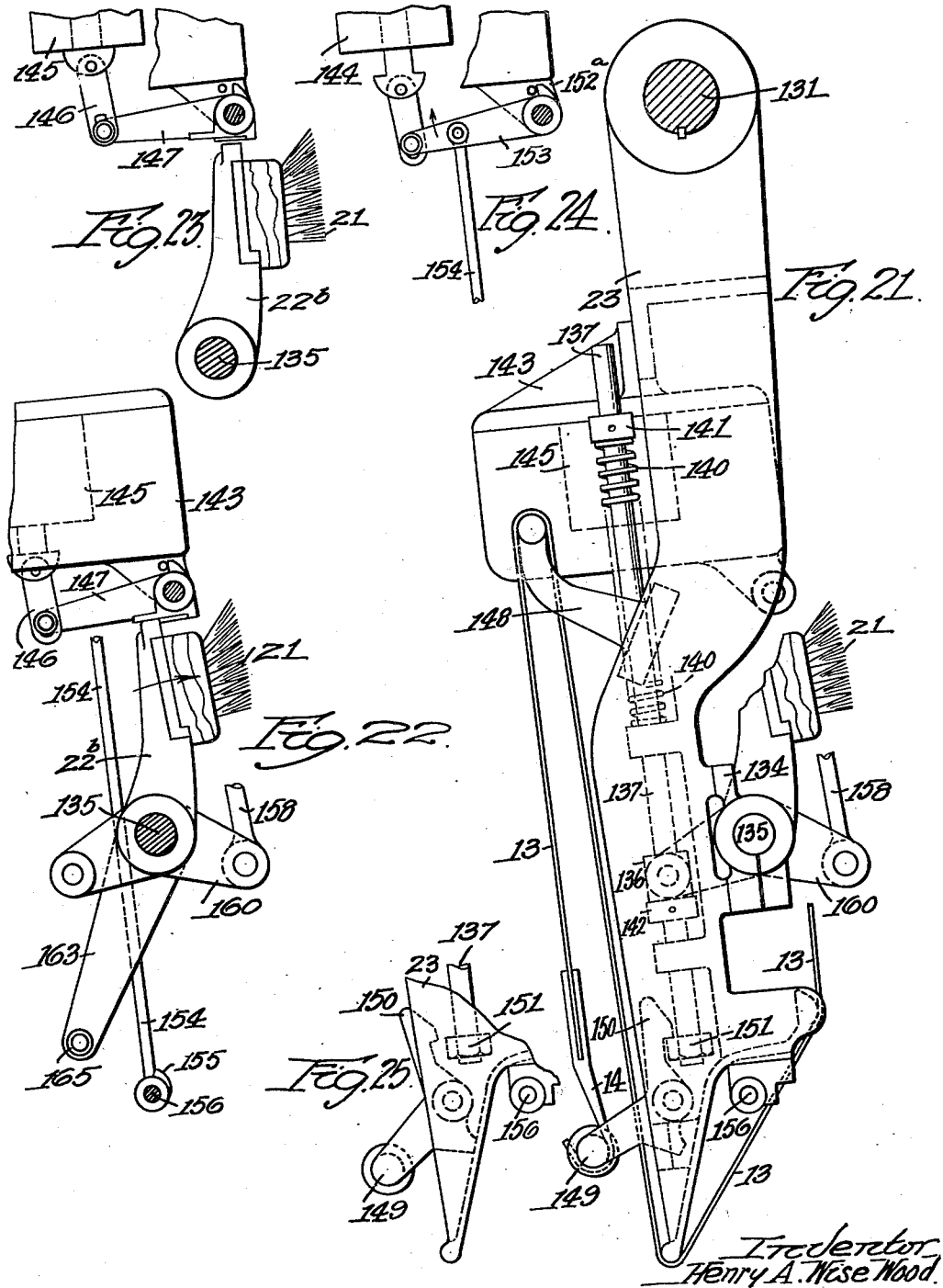

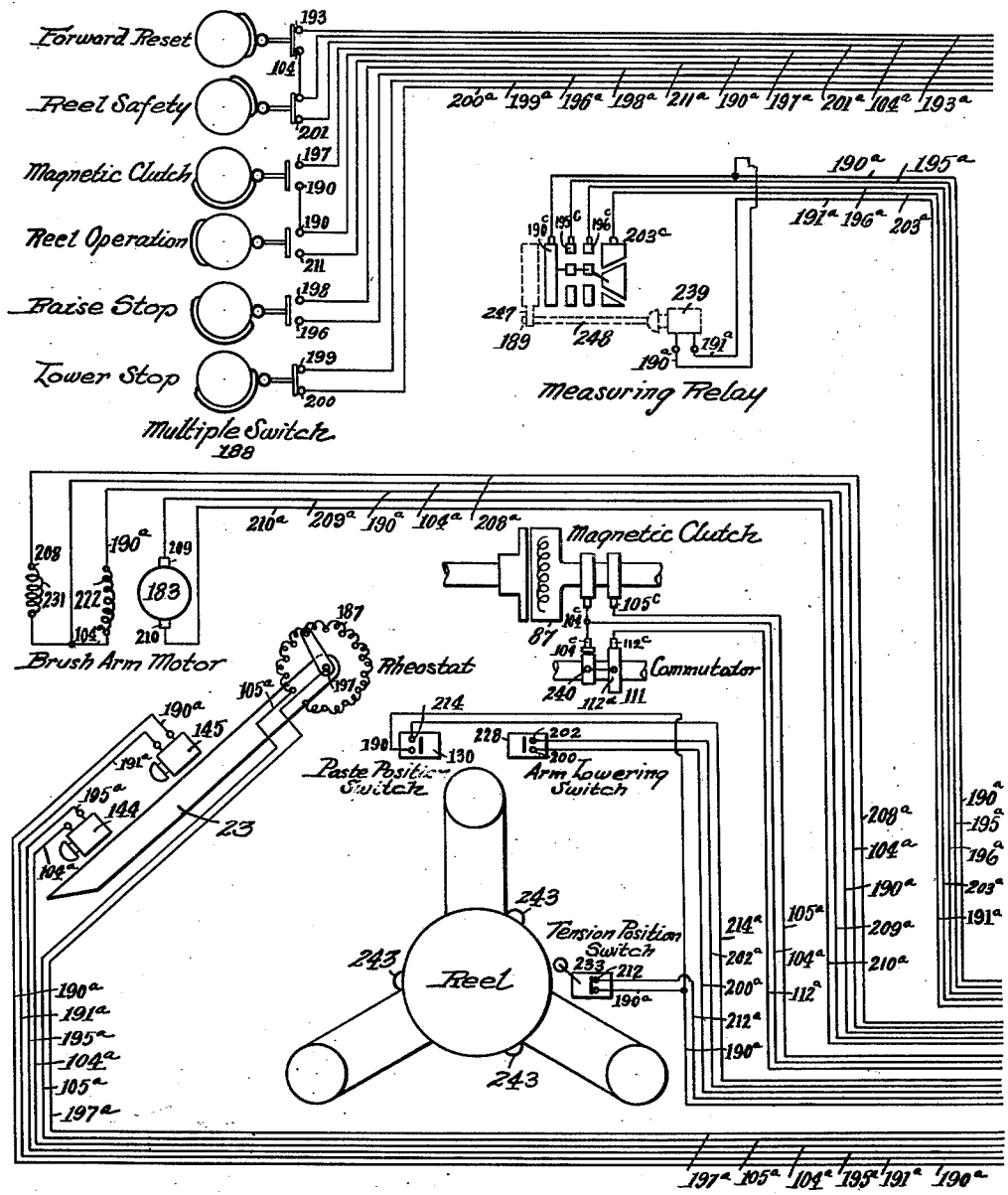

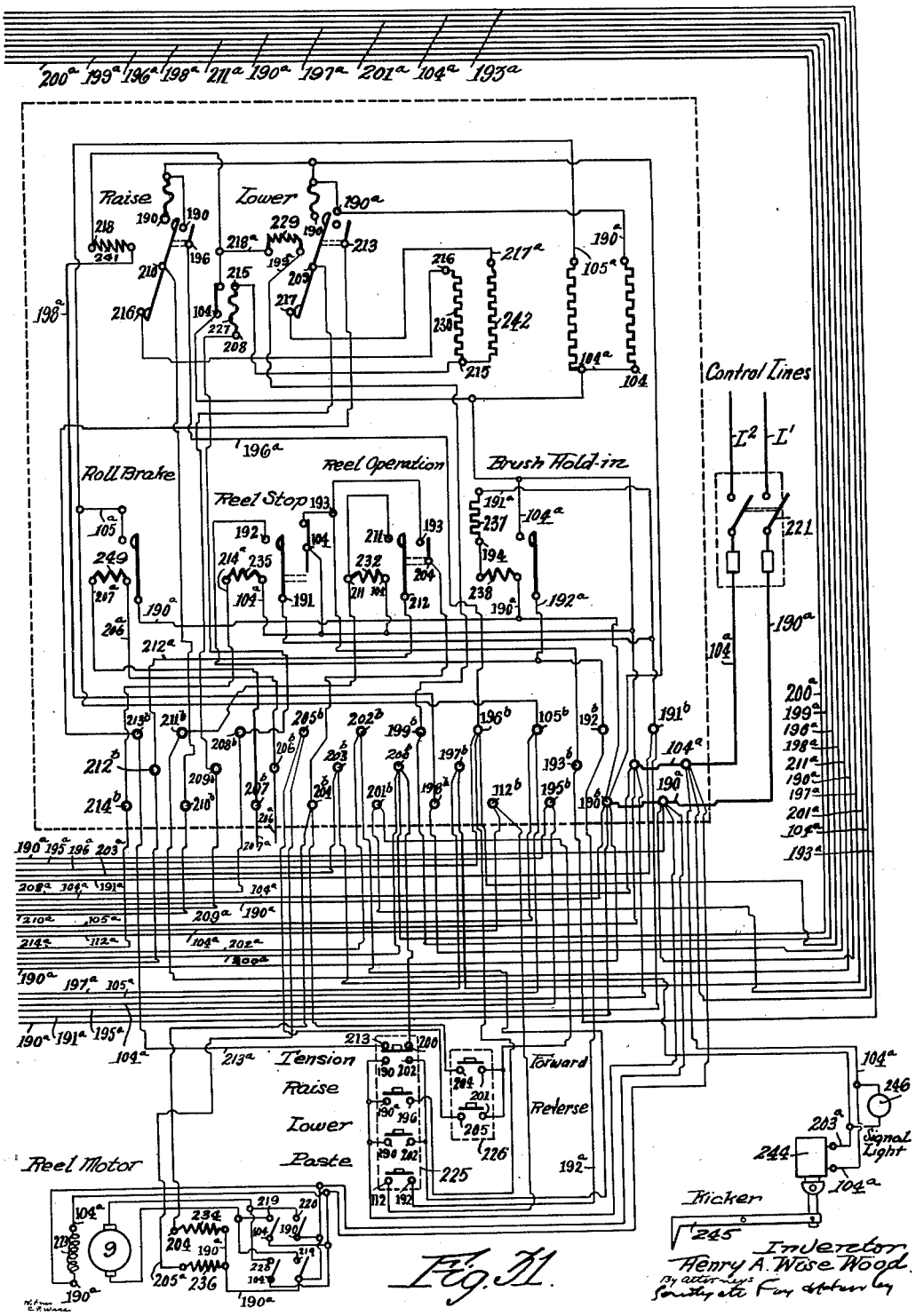

2,148,094

UNITED STATES PATENT OFFICE 2,148,094

WEB SPLICING DEVICE

Henry A. Wise Wood, New York, N. Y., assignor to Wood Newspaper Machinery Corporation, New York, N. Y., a corporation of Virginia Application August 22, 1933, Serial No. 686,225
Renewed May 5, 1936

24 Claims. (Cl. 242—58)

This is an improvement on my prior applications for patent, Serial No. 591,077, filed February 5, 1932, now Patent No. 2,048,767, and Serial No. 610,748, filed May 12, 1932, now Patent 1,957,122, and contains matter shown and claimed therein.

The chief objects of this invention are to provide a simplified drive for speeding up the fresh roll preparatory to splicing; to provide a one-point clutch on each spindle of the roll supporting device with a single magnetic clutch in the drive shaft outside the spindle, thereby permitting the use of a single commutator to determine the point at which the brush is dropped to bring the running web against the fresh roll; to provide for automatically selectively engaging the particular clutch which is carried on the incoming roll spindle so that, as the fresh roll is brought into the running roll position after splicing, this clutch is automatically disengaged; to provide a latch, such that, when the reel is run in the reverse direction, the clutch is prevented from reengaging so that possible damage is eliminated should the running roll be brought up to approximately the fresh roll pasting position; to provide a new type of switch mechanism for locating the roll prior to pasting in its proper position with respect to the brush, the position of which is controlled by the measuring arm as it sets the variable speed device, thus permitting operation of the reel stopping device to locate the roll by a projection on the reel proper; to provide this means for eliminating the necessity for operating a switch by the surface of the roll, the toe of which switch, in said Patent No. 2,048,767, had to be moved out of the path of the web before splicing could be accomplished; to provide a simplified brush arm since all the monkey switch mechanism is removed therefrom; to provide a further simplified action of the brush arm by a mechanism which resets the brush and web severing knife through action of the arm from operative to inoperative position, and to reduce the cost of the machine.

Other objects and advantages of the invention will appear hereinafter.

Reference is to be had to the accompanying drawings, in which—

Fig. 1 is an end view of a machine constructed in accordance with this invention in the form of an ordinary type of rotatable reel for carrying web rolls;

Fig. 2 is an elevation of the same;

Fig. 3 is an end elevation of the roll support, showing a simplified construction;

Fig. 4 is a sectional view on the line 4—4 of Fig. 3;

Fig. 5 is a longitudinal section of one end of the spindle drive;

Fig. 6 is an end view of the same as indicated by the arrow 6 in Fig. 5;

Fig. 7 is a view looking in the direction of the arrow 7 in Fig. 3;

Fig. 8 and Fig. 9 are side and end views of the one-point clutch;

Fig. 10 is a sectional view showing the latch for holding the clutch out of engagement after pasting;

Fig. 11 is an elevation of the cam cooperating therewith;

Fig. 12 is a plan partially in section of the magnetic clutch arrangement;

Fig. 13 is an elevation of the same;

Fig. 14 is a view partially in section showing the selector rings for feeding the magnetic clutch;

Fig. 15 is an end view showing the manner in which the paste positioning switch is adjusted to regulate the stopping of the reel;

Fig. 16 is an elevation of the same, partly in section, as indicated by the arrow 16 in Fig. 15;

Fig. 17 is an elevation of the brush lifting and lowering mechanism;

Fig. 18 is a front elevation of a part of the brush supporting arm;

Fig. 19 is a similar view of the end of the brush supporting arm;

Fig. 20 is an edge view of the same showing the parts in lowered position;

Fig. 21 is a similar view partly in section showing the cooperation of the tension straps with the brush arm;

Fig. 22 is a similar view showing the brush moved back to its extreme position;

Fig. 23 is a similar view showing the brush unlatched;

Fig. 24 is a similar view showing the knife operating solenoid;

Fig. 25 is a view similar to the lower part of Fig. 21 showing the unlatching of the rod which actuates the brushes on their axes;

Fig. 26 is a view of the connections between the shaft carrying the brushes and that carrying the knives;

Fig. 27 is an end view of the clutch used at this point;

Fig. 28 is a sectional view on the line 28—28 of Fig. 17;

Fig. 29 is a view of the drive operated by the brush operating motor, and

Fig. 30 and Fig. 31 are wiring diagrams which together constitute a single diagram of the electrical connections for the entire machine.

As stated, this invention relates to a web splicing device and is shown as built along the same lines as that described in the first of my above mentioned patents and involves modifications of certain parts, particularly the manner in which a magnetic clutch is used to start up the first roll and the manner in which the reel is positioned just prior to splicing. The machine is simplified by eliminating the necessity of the so-called monkey switches and of their wiring in the above identified patent. The machine accomplishes the objects of said patent but in a simplified manner and some of the features of said application are shown herein in detail but are not claimed except in combination because they constitute the subject matter of said Patent No. 2,048,767.

Referring to Figs. 1 and 2, it is evident that brackets 1 and 2 secured to press columns 3 provide rotatable supports for bearings 4 and 5 respectively. A central shaft 6 is mounted in and rotates with bearings 4 and 5, thereby providing a rotatable support for spiders 7 and 8. The manner in which these spiders are rotated by motor 9 and adjusted for side register and varying roll widths by motor 10 is fully described in said Patent No. 1,957,122.

As described in said former case movable spindles 11 and stationary spindles 12 provide rotatable mountings for a running roll R and spare roll S. The particular construction shows means for mounting three such rolls in this reel but it is not intended to limit this case to any particular number, since it is entirely possible to use this device with a reel which carries two or more paper rolls. Tension members are provided to operate against the running roll R in the form of straps 13, one end of each of which is secured to removable hook 14 partially encircling a shaft 15 which is carried in brackets 16 secured to the foundation. The other end of straps 13 are severally connected to levers 17 which are pivoted in brackets 18 secured to the frame of the press and carry at their outer ends pivotally connected weight rods 19 on which are placed removable weights 20 to secure the desired tension in web W.

For executing the splice at the proper time web pressing devices or brushes 21, secured to arms 22, 22ᵃ and 22ᵇ which are pivotally mounted on brush arm 23, operate between and around tension straps 13 to press the web W against the fresh roll S which carries a prepasted leading end. Knife 24 is pivotally mounted on brush arm 23 and at the proper time operates between and around straps 13 to sever the old web after the splice has been accomplished. When the running roll R has diminished in size until the operator judges that a splice will soon be necessary, brush arm 23, which normally is in the inoperative position, as shown by dotted lines in Fig. 1, is lowered to the full line operative position by the pressing of a push button, as will be described later. The lowering of this brush arm sets up a sequence of operations whereby the fresh roll S is rotated up to speed through a drive brought in from the press proper to the particular spindle which carries the fresh roll S. The drive of this fresh roll is accomplished through a spindle 12 to prevent any disturbance to the surface of the fresh roll which carries the prepasted points, a speed setting device having previously adjusted the rotation of this fresh roll according to its diameter so that the periphery is running substantially at surface speed of the web W.

When the running roll R is virtually exhausted, another push button is pressed by the operator and the brushes 21 press the web W against the fresh roll S to make the splice after which the knife 24 severs the old web. The brush arm 23 is then raised, by the operation of a motor, to the inoperative position and the fresh roll, which has now become the running roll, is moved against the tension straps 13 by rotation of the reel. In said previous case a magnetic clutch was carried on each of the spindles 12 to thereby select the particular spindle carrying the fresh roll. This necessitated electrical contacts and selector rings on the spider and due to bulkiness of the magnetic clutch prevented a design which could be worked in restricted space. While the net result accomplished with this invention is essentially the same as that in said case, the method of accomplishing it is much simpler and less expensive to produce.

Referring particularly to Figs. 3, 4, 5 and 6, reel shaft 6 is mounted in bearing box 5 and carries spider 8 splined thereto to prevent rotation with respect to the shaft but to permit longitudinal adjustment with respect to shaft 6 through the use of screw 25 and a split nut disconnecting arrangement described in said Patent No. 1,957,122. The end plate 26 is secured by screws 26ᵃ to end bracket 27 which, through guide bracket 126, secured thereto and operating in a slot of brace 29, secures these parts with respect to rotation of shaft 6 and spider 8 but permits longitudinal movement of the entire bracket and end plate arrangement to compensate for side register and to adjust for different width rolls. Brace 29 is secured to the frame of the press. End plate 26 is held in proper relation with spider 8 by covers 30, one on each of the three spider arms, having projecting edges over the outside periphery of end plate 26. This permits rotation of spider 8 and covers 30 by holding plate 26 and its attached bracket 27 in longitudinal relationship.

Drive for the fresh roll is brought in from the press through the magnetic clutch and a variable speed device 101 to shaft 31 on which is mounted bevel gear 32 by a spline running longitudinally of the shaft. A movable gear bracket 33, through ball bearings 34, provides a mounting for bevel gear 35 so that it is kept in proper relationship with its meshing gear 32. Bevel gear 35, through ball bearing 36, is mounted in bracket 33 and is splined to vertical shaft 37, bracket 33 being slidably mounted in a hole of end bracket 27. The purpose of this adjustable mounting is to insure proper meshing of gears 32 and 35 even though shaft 6 may sag under the weight of heavy paper rolls, and thereby gives a well-designed drive down to vertical shaft 37. The lower end of shaft 37 is mounted in end bracket 27, by ball bearings 27ᵃ, and carries a bevel gear 38 which meshes with bevel gear 39 carried on short shaft 40. The other end of the shaft 40 carries pinion 41 secured thereto. Shaft 40 is mounted in ball bearings which are carried in bracket 27. Pinion 41 meshes with gear 42 which is secured to large gear 43 which is rotatably mounted on bushing 43ᵃ carried on spider 8 and concentric therewith. Large gear 43 meshes with a gear 44 loose on a spindle 48, one each of which is supplied for each spindle 12. Gear 44 is secured to clutch member 45 the latter of which is rotatably mounted on ball bearings 46. The inner race of ball bearing 46 is carried on sleeve 47 secured to spindle shaft 48. Spindle shaft 48 is mounted in spider 8 by ball bearings 49 and 50 and its end motion is controlled by the clamping of the outer race of ball bearings 50 by seal 51 secured to the spider proper. The inner race of ball bearing 50 bears against a shoulder of spindle shaft 48 in cooperation with inner seal 52, spacer 53, inner seal 54, inner race of ball bearing 49, spacer 55, inner race of ball bearing 46 and sleeve 47. All of these are clamped with nut 56 which is threadedly attached to the end of spindle shaft 48. It will be seen that spindle 12 is attached to spindle shaft 48 and provides a suitable mounting for the end of the paper roll core. Screw 57 is secured in spindle 12 and thereby provides a suitable key for fitting in the keyway of the paper roll core and in this manner insures driving the paper roll when power is applied to spindle 12.

Movable clutch 58 is slidably mounted on sleeve 47 and splined thereto by a spline 58ᵃ. It carries a circumferential slot 59 in which are mounted slidable shoes 60. The slidable shoes 60 are pivotally mounted in yoke 61 by studs 62 and 63, the latter of which is longer than stud 62, permitting the pivotal mounting of a latch 64 which projects through an opening in cover 30. Yoke 61 is secured to rock shaft 65 which is rotatably mounted, one in each of the projecting arms of spider 8, carrying secured on one end a collar 66 and on the other a spring arm 67. These prevent any longitudinal motion of shaft 65. The outer end of arm 67 is bifurcated and through a pin 68 secures one end of spring 69. The other end is secured by a small bracket 70 to the main portion of spider 8. This tends to turn shaft 65 in a clockwise direction as viewed in Figs. 4 and 5 such that the faces of clutches 58 and 45 will engage. These clutch faces are so designed as shown in Figs. 8 and 9 that engagement is possible at only one particular point in their relative rotational positions.

The lower end of yoke 61 carries a roller 71 rotatably secured thereto by stud 72 with the roller bearing against cam 73 which is secured to end plate 26 by screws 74. On Fig. 3 it will be noticed that at point A the cam 73 is cut away in such a way that yoke 61 is permitted to rotate in a clockwise direction, thereby engaging the one-point clutch. This clutch engagement is permitted until the spider is rotated to such a position that roller 71 rides up on cams 73 at point B at which time the clutch is disengaged. Latch 64 is pulled in a counterclockwise direction by spring 75, one end of which is secured thereto, the other end of which is secured to yoke 61. As cam roller 71 rides up on cam 73 at point B the tooth of latch 64 cooperates with block 76 secured to the inner face of cover 30 as demonstrated in Fig. 10. Thus, if the reel is rotated in a clockwise direction, as viewed in Fig. 3, after having passed up over the point B latch 64 will prevent the clutch teeth from being re-engaged. When, however, this spindle has made a cycle of revolution in a counterclockwise direction, as viewed in Fig. 3, and the cam roller 71 passes over point A it is necessary to release this latch 64 before the clutch teeth are permitted to engage. This is done by a small block 77 secured to end bracket 27 serving as a cam for lifting the outer end of latch 64, thereby releasing it from block 76 and permitting the one-point clutch to engage. This latch 64 constitutes a safety device so that in case the reel is run in a clockwise direction while the spindle is running at full speed the clutch teeth cannot engage and cause damage. It is evident that when in normal operation the clutch teeth are engaged this occurs before the clutch part 45 is started up by the magnetic clutch attaching the drive to the press. This permits an easy engagement of the solid clutch teeth and thereby minimizes any shock to the revolving parts.

By referring to Fig. 12 this drive may be traced back to the outer end of shaft 31 on which are successively mounted commutator 78, gear 79, bearing against a shoulder 80 of the shaft on the other side of which is carried the inner race of ball bearing 81, spacer 82, the inner race of ball bearing 83, spacer 84, the inner race of ball bearing 85 and sleeve 86, which is keyed thereto and provides mounting for magnetic clutch armature 87. Against these elements bears washer 88 and lock nut 89 keeping them in longitudinal relationship. As usual magnetic clutch armature 87 carries a friction pad 90 for bearing against plate 91 which is mounted on steel disc 92, the inner circumference of which is secured to gear 93. Gear 93 is rotatably mounted on ball bearings 83 and 85 and has secured to it a thrust ring 94 for taking care of end thrust when the magnetic clutch is energized so that plate 91 contacts with friction pad 90. This friction pad 90 is so adjusted that when the magnetic clutch is deenergized there is a separation between friction pad 90 and plate 91. Ball bearing 81 is mounted in bracket 95 with its outer race held in place by seal 96. Bracket 95 is secured to variable speed transmission bracket 95ᵃ which in turn is secured to the press framework. This locates shaft 31 longitudinally and prevents end motion. Gear 93 meshes with intermediate 97 which is carried on stud 98 securely mounted in bracket 95. Intermediate 97 in turn meshes with gear 99 which is carried on shaft 100 of the variable speed device 101. Variable speed device 101 is driven from the press in any convenient manner. Thus it is evident that power can be supplied from the press through variable speed device 101, gear 99, intermediate 97, gear 93 and from there to shaft 31 through magnetic clutch 87 after which power is transmitted to bevel gears 32 and 35, 38 and 39 into the spindle as described above.

A suitable cover 102 is provided to enclose the magnetic clutch 87. An insulated block 103 is mounted in bracket 95 providing support for electrical brush contacts 104 and 105 which bear against selector rings on commutator 78. Through keyways 106 in shaft 31 wires may be run from the selector rings on commutator 78 to terminals 107ᵇ and 108ᵇ carried on magnetic clutch 87, thereby carrying electrical power to this clutch. Cover 108 provides protection for these electrical brush contacts. Since it is desirable in this case to drive shaft 31 at a speed different from that of the spindle speed it is necessary therefore to provide another commutator, so driven that a live segment carried on it passes a stationary point once for each revolution of the spindle 12. A jack shaft 109 is provided mounted in bracket 95 and secured to prevent end motion on which is rotatably mounted gear 110 meshing with gear 79 carried secured on shaft 31. Mounted on gear 110 is a commutator 111 carrying one solid ring 112ᵈ and another ring carrying a short live segment 240. It will be understood that the ratio of gears of 79 to 110 is such that this commutator rotates one revolution for each revolution of the spindle 12 so that the short live segment 240 may be used in connection with electrical brush contacts 112ᶜ and 104ᶜ to control the point at which the brush presses the old web against the fresh roll.

By referring particularly to Figs. 1, 15 and 16 it will be seen that in this embodiment the manner of setting the adjustable speed mechanism 101 is accomplished in exactly the same way as that used in said Patent No. 2,048,767, and need not be described in detail here. Briefly it is accomplished through a projection 114 of spider 8 bearing against a roller 115 carried on arm 116 thereby releasing pawls 117 and permitting measuring arm 118 to descend. As the spare roll S is moved in a clockwise direction by the reel its surface comes in contact with roller 119 which is carried on measuring arm 118 thereby forcing it up. Pawls 117 cooperate with a ratchet 120 carried on measuring arm 118 and hold it in position. Through the shaft 121, in a manner described in said Patent No. 2,048,767, adjustable speed mechanism 101 is regulated to give the surface of spare roll S the proper speed. Secured to shaft 121 is an arm 122, the free end of which is pivotally connected to link 123, the other end of which link is connected to lever 124 pivotally mounted on projection 125 of bracket 126. Bracket 126 is secured to end bracket 27. The lower end of lever 124 is connected to link 127, the other end of which is pivotally secured to a small carriage 128 carrying rollers 128ᵃ which ride on curved projections 129 of bracket 126. These projections are substantially concentric with the center of the reel. On carriage 128 is mounted paste position switch 130. Projection 114 of spider 8 operates against the switch roller of paste position switch 130 to close the contacts therein when this projection reaches the position in which the switch 130 is located. By a study of these links and levers it is quite apparent that when measuring arm 118 is lifted to its upper position paste position switch 130 is bodily moved toward the left as viewed in Fig. 15, whereas, when a small roll is being brought up for splicing, measuring arm 118 rests at a lower position placing paste position switch 130 toward the right hand end of bracket 126. The design is such that within the limits of the machine paste position switch 130 in cooperation with projection 114 stops the reel at such a point that the distance between the fresh roll and the web is the same for different size rolls. In this manner the device used for setting adjustable speed mechanism 101 to compensate for roll diameters is made to adjust the position where the reel stops and thereby gives a simple mechanism for this function. It has the further advantage that this bracket 126 is mounted on end bracket 27 and therefore moves in when the width of roll is changed and in this manner obviates any necessity for moving the monkey switch toe which was employed in said Patent No. 2,048,767 and which was mounted on the brush arm.

In eliminating the monkey switch mechanism from the brush arm the brush arm is thereby very much simplified. By referring to Figs. 17, 18, 19, 20 and 21, a simple construction of the brush arm is shown therein the arm 23 carries two projections at its upper end which are keyed to shaft 131, the shaft being rotatably mounted in brackets 132 and 133 secured to the frame of the press. Secured to brush arm 23 are brackets 134 which provide rotatable mounting for shaft 135 to which are secured brush brackets 22, 22ᵃ and 22ᵇ carrying brushes 21. Brush bracket 22ᵇ is a simple brush carrying member while brush brackets 22 and 22ᵃ have projections for carrying poppets 136 encircling spring rods 137. These spring rods are slidably mounted in bearings 138 and 139 secured to brush arm 23. Abutting bearing 139 and encircling the spring rod 137 is brush spring 140, the other end of which bears against collar 141 which is secured to spring rod 137. This tends to force spring rod 137 upwardly and, through collar 142, which is secured to spring rod 137 and presses against poppet 136, to rotate shaft 135 and the brush brackets attached thereto in a clockwise direction as viewed in Fig. 20. These brushes are prevented from rotating by a latch 147 which hooks over the edge of the center brush bracket 22ᵇ. It will be seen in Figs. 18, 21 and 22 that a solenoid bracket 143 is mounted on arm 23 and provides a housing for solenoids 144 and 145, the latter of which is connected by link 146 with latch 147 which is pivotally mounted on a projection of solenoid bracket 143 and catches on the upper edge of brush bracket 22ᵇ, preventing its forward motion. When solenoid 145 is energized, however, this latch is released and permits springs 140 to rotate all the brushes 21 in a clockwise direction as viewed in Figs. 20, 21 and 22 pressing the running web against the fresh roll. It will be noted that there are four such brush springs, the purpose being to regulate the pressure that brushes 21 apply to the old web in pressing it against the fresh roll according to the width of the roll.

It is apparent from the design of this mechanism that it is intended to use four straps 13 for providing tension. When the width of the roll is diminished by one page one of these straps is inoperative, when diminished by two pages; i. e. when a half-roll is used, two of these straps are inoperative. The device is so designed that by making the straps inoperative and latching them up, as many springs are made inoperative as are straps latched up. This is accomplished as shown in Fig. 21 by passing the strap up over the lower end of brush arm 23; i. e., down near the part which serves as a hanger for the knife then passing it around stationary projection 148 which is secured to arm 23 and placing hook 14 on the end 149 of latch lever 150. Latch lever 150 is pivotally mounted on a projection 152 carried at the lower end of arm 23 and carries at its upper end a hook latch which cooperates with nut 151 carried on the lower end of spring rod 137. This hooking up of strap 13 rotates latch lever 150 in a clockwise direction as viewed in Fig. 21 and thereby holds that particular spring rod 137 in fixed relation so that, even though brushes 21 move forward, the spring on that particular spring rod is not effective in producing pressure of the running web against the fresh roll. Thus in this manner, if one strap is latched up, the pressure on the web is three-quarters of what it would be were all the springs operating and with two straps hooked up two springs are automatically made inoperative.

The bracket 143 which provides a mounting for solenoids 144 and 145 has a projection 152ᵃ similar to the one carrying latch 147 on which is pivotally mounted an arm 153. The outer end of this arm 153 is supplied with a loose link connection to the plunger of solenoid 144. Nearer its center of rotation arm 153 is pivotally connected with a rod 154 which passes down and operates against a cam surface 155 secured to knife shaft 156. Thus when solenoid 144 is energized rod 154 is lifted disconnecting the surfaces at cam 155 and permitting knife 24, which is carried by brackets 156ª secured to knife shaft 156 to move in a counterclockwise direction thereby severing the old web. Bracket 133 carries a lower projection which provides, through stud 157, a pivotal connection to reset rod 158 in which there is a turnbuckle 159 to permit length adjustment. The arrangement of centers of stud 157 and shaft 131 is such that the raising of arm 23 to its inoperative position provides a motion of reset rod 158 relative to brush bracket shaft 135. Loosely mounted on shaft 135 is an arm 160 which is pivotally connected to reset rod 158 and carries clutch teeth 161 meshing with teeth of clutch 162 which is secured to the outer end of shaft 135. The motion of reset rod 158 and arm 160 is such that when the brush arm is in its lowered position there is sufficient play between the teeth of clutch 162 and arm 160 to permit brushes 21 to move forward when the latch is released by solenoid 145. When, however, brush arm 23 is moved to its inoperative position the teeth of arm 161 and clutch 162 contact so that the brush shaft 135 is reset and brush latch 147 is reengaged. Arm 160 carries a lower projection 163 on which is mounted a stud 164 rotatably carrying roller 165 for engaging with cam 166 secured to knife shaft 156. It is apparent that when arm 163 is rotated in a counterclockwise direction by the lifting of the arm to inoperative position that roller 165 will cooperate with cam 166 and reset knife 24 so that rod 154 reengages the cam 155.

Bracket 132 comprises not only a mounting for brush arm shaft 131 but also provides support for the brush arm lifting and lowering mechanism. Arm 167 is loosely mounted on shaft 131 on its upper end, the lower end being connected with brush arm 23 by shear pin 168. Shaft 169 is rotatably mounted in bracket 132 and carries on one end crank 170 to which spring rod 171 is pivotally secured by stud 172. Spring rod 171 pierces poppet 172ª which is pivotally mounted on arm 167. Spring 173 is mounted on spring rod 171 and its pressure adjusted by jam nut 174. Secured to spring rod 171 is collar 175 which, when it bears against poppet 172ª as crank 170 is rotated in a clockwise direction as in Fig. 28, operates to lift brush arm 23 from the operative to the inoperative position. In the position shown in Fig. 28 spring 173 exerts pressure against poppet 172ª and through arm 167 holds brush arm 23 in its lowered operating position. This position is determined by an adjustable stop 176 carried in arm 167 and bearing against stop pin 177 carried in bracket 132. Thus should any undue strain be placed on arm 23 shear pin 168 will break, permitting the arm to swing free in any direction and thereby obviating damage thereto. Thus it is seen that the lifting and lowering of the brush arm is accomplished by partial rotation of shaft 169 which carries on its one end crank 170. The other end of this shaft has secured thereto worm wheel 178 which meshes with worm 179. Worm 179 is secured to and rotates with shaft 180 to which is also secured worm wheel 181 meshing with worm 182 secured to the armature of motor 183. These parts are all mounted on bracket 132. Thus by energizing motor 183 to run in the one direction, brush arm 23 is lowered from inoperative to operative position. When the brush arm has performed its functions the rotation of motor 183 in the opposite direction will then move brush arm 23 from its operative to its inoperative position. The outer right hand end of shaft 169 as viewed in Fig. 17 carries a spiral gear 184 which meshes with gear 185 carried on shaft 186. This shaft 186 connects on the one end with rheostat 187, which serves to reduce the voltage on the magnetic clutch as the newly spliced roll is brought into the tension straps, and on the other end to multiple switch 188 which performs functions that will be described later, such as limiting the travel of motor 183 in both directions, placing power on the magnetic clutch and various other functions. In Fig. 1 measuring relay 189 is shown mounted alongside adjustable speed mechanism 101 and serves the same purpose that it does in said Patent No. 2,048,767. Its construction is identical with that in said patent and therefore forms no part of this invention except in combination. Its operation will be fully described in a description of the wiring diagram.

Referring to the electrical diagram the operation of this machine may be traced in the following manner:

When the main switch 221 is closed, electrical power is then connected from the main lines L1 and L2 to lines 190ª and 104ª respectively. This puts power on field coil 222 of motor 183 through lines 104ª and 190ª running thereto, on field coil 223 of reel motor 9 through lines 104ª and 190ª and on field discharge resistance 224 through lines 104ª and 190ª. With the brush in its inoperative position as shown in dotted lines, Fig. 1, paper is used from the running roll until in the opinion of the operator it is time to lower the brush arm and set the pasting mechanism in readiness. This is done, when the running roll has decreased to some eight or ten inches in diameter, by the pressing of the "lower" button in station 225. This pressing of the "lower" button in station 225 connects the contact 190, which is one side of the power, with contact 202 which may be traced to terminal 202ᵇ thence to contact 202 in "arm lowering" switch 228 which when the reel is in the proper position for lowering the brush arm is closed so that contact 202 is connected with contact 200. Line 200ª may be traced to terminal 200ᵇ and thence to contact 200 on the "lower stop" switch in multiple switch 188. With the arm in the raised position this "lower stop" switch is closed connecting contact 200 with contact 199. Contact 199 leads back through wire 199ª to terminal 199ᵇ and from there to one side of lower coil 229, the other side of which is connected to wire 218ª and through the contact of thermal relay 227, which is normally closed, to contact 104 which is the other side of the line. This connection energizes coil 229 closing contacts 190 and 209, 190 and 213 and opens contacts 209 and 217. The closing of contacts 190 and 213 establishes a hold-in circuit for the "lower" coil 229 such that even though "lower" button in station 225 is released, opening contacts 190 and 202 connection to line 190ª is still established through 190 to 213 of the "lower" contactor through line 213ª to terminal 213ᵇ and from there to contact 213 which is an upper contact of "tension" button in station 225 and is normally connected with contact 200. Line 200ª runs to terminal 200ᵇ and from there to "lower stop" switch in multiple switch 188 where it connects with line 199ª as has been described above. Contact 209 is connected to terminal 209ᵇ and from there by wire 209ª to one brush of the armature of motor 183 thereby placing power on one brush of the motor. The other brush 210 may be traced through wire 210ª to terminal 210ᵇ and from there to the center of the "raise" contactor, the lower end of which connects with contact 216 and through series resistance 230 to contact 215 and from there to one side of thermal relay coil 227, through thermal relay coil 227 to contact 208 and from there through terminal 208b to one side of series field 231 of motor 183 the other side of which is connected to line 104a. In this manner power is placed on the armature of motor 183 causing it to rotate in such a manner that the brush arm is lowered. It has been found in actual operation that, by lowering the brush arm prior to splicing, increased wrap is obtained around the running butt. Provisions are made in this case for permitting the brush arm to be lowered a slight amount at a time so that the advantage of this added tension may be obtained when desired. This alternate manner of lowering the brush arm is provided in a "tension" button in station 225 which, when pressed, connects contacts 190 and 202 exactly as is done by the lower button accomplishing the same result except that when the tension button is operated to close these contacts it opens contacts 213 and 200.

It is apparent by tracing from the "lower" contactor the contact 213, which connects with line 190a when the "lower" contactor operates, through to its terminal to the top of "tension" button in station 225 through contact 200 and a series of connections described above, that the pressing of the tension button opens the hold-in circuit on the lower coil contactor. Thus, so long as the "tension" button is held down, the arm will be lowered but the instant the connection is broken between contacts 190 and 202 the lowering of the arm will cease.

During the process of lowering the brush arm, multiple switch 188, which is geared thereto, is rotated so that the "magnetic clutch" contact closes, connecting contact 190, which is one side of the line, with contact 197. By tracing line 197a it will be seen to go to terminal 197b and thence to the center of the arm of rheostat 187. Connection is made through this arm and the rheostat to the outcoming wire 105a which returns to terminal 105b and thence to brush 105c bearing against the ring carried on commutator 78. This ring is connected to one terminal of magnetic clutch 87 the other terminal being connected to ring 104d against which bears brush 104c connected with line 104a, which is the other side of the power. It is apparent then that a reduced voltage is placed on magnetic clutch 87 such that as the arm of rheostat 187 rotates in a counterclockwise direction, as shown in the wiring diagram, resistance will be removed from this circuit until such time as the rheostat arm bears against contact 105 thereby placing full voltage on magnetic clutch 87. The energizing of clutch 87 through gearing described above brings the incoming roll up to speed.

As the brush arm continues to be lowered "forward reset" contacts 104 and 193 in multiple switch 188 are opened. The reclosing of these contacts as the brush arm is raised performs a function which will be described later. Just before the brush arm reaches its lower limit, i. e. before the motor 183 is stopped, the "reel operation" contact in multiple switch 188 closes contacts 190 and 211, the latter of which may be traced to terminal 211b thence to one side of "reel operation" coil 232 the other side of which is connected to line wire 104a. This coil is thereby energized closing contacts 211 and 212, 193 and 204. The closing of contacts 211 and 212 establishes a circuit through line 212a to terminal 212b and from there through wire 212a to a contact 212 in "tension position" switch 233 which is normally closed connecting contacts 212 with line wire 190a. This serves as a hold-in circuit for reel operation coil 232. As will be described later, this contact in tension position switch 233 is held closed until after the splice has been made and the reel rotated to the proper position to give normal operating tension. Contact 204 may be traced to terminal 204b and from there to one side of coil 234, the other side of which is connected to line wire 190a. This coil is the forward operating coil of reel motor 9. Contact 193 may be traced to terminal 193b and also to a normally closed contact 193 on the "reel stop" contactor where it is connected with contact 104 which is one side of the line. Thus it is seen that when contacts 193 and 204 are closed, forward operating coil 234 becomes energized closing contacts 219 and 104, 220 and 190. Contacts 104 and 190 constitute the line wires while contacts 219 and 220 feed the armature of reel motor 9, causing it to rotate in such a direction as to bring incoming rolls, carried by the reel, toward the brush arm. This rotation of the reel continues until the projection 114 shown in Fig. 15 closes contacts 190 and 214 in "paste position" switch 130. Contact 190 constitutes one side of the line and when it is connected to 214 through "paste position" switch 130 the circuit may be traced through line 214a to terminal 214b and from thereto one side of "reel stop" coil 235, the other terminal of which is connected to line wire 104a. This energizes reel stop coil 235 closing contacts 192 and 191 opening contacts 193 and 104. The opening of contacts 193 and 104 breaks the circuit feeding forward operating coil 234 thereby deenergizing that coil and causing contacts 219 and 104, 220 and 190 to open, removing power from reel motor 9 and causing it to cease rotation. This stops the reel with the fresh roll in proper position for pasting. The closing of contacts 191 and 192 sets up one of the conditions demanded before a splice is made, i. e. that the roll is in the proper location for splicing. That particular circuit will be traced later.

When the brush arm is up, the "reel safety" switch in multiple switch 188 is closed connecting contacts 104 and 201 but, with the arm down, contacts 104 and 201 are not connected. By tracing line 201a it will be found to go to terminal 201b on the control board and thence to one side each of the "forward" and "reverse" buttons carried in station 226. The other contact of the "reverse" button in station 226 is contact 205 and is connected with terminal 205b and thence to one side of the reverse reel coil 236, the other side being connected to line wire 190a. It is apparent that when brush arm 23 is in the lowered or operative position with the "reel safety" contacts 104 and 201 open in multiple switch 188 it is impossible to operate the reverse reel coil 236 by making contacts 201 and 205 in station 226. This serves as a safety to prevent motion of the reel with possible damage to the mechanism. It is similarly true that making of contacts 201 and 204 by the "forward" button in station 226 that it is impossible by this means to operate forward reel operating coil 234. The operation of brush arm motor 183 in a direction to lower the brush arm ceases when the "lower stop" limit in multiple switch 188 opens the contacts 199 and 200. This is apparent since contact 199 as traced above goes through line 199ᵃ to terminal 199ᵇ and from there to one side of "lower" contactor coil 229. Contact 200 through a similarly numbered terminal is connected through "tension" button in station 225 to terminal 213ᵇ which runs through wire 213ᵃ to a similarly numbered terminal on the control board and from there to a movable contact operated by lower coil 229 and there closed with line wire 190ᵃ. It is evident then that the opening of contacts 199 and 200 in the lower stop limit in multiple switch 188 breaks the circuit energizing lower coil 229 permitting contacts 190 and 209, 190 and 213 to open. The opening of contacts 209 and line wire 190ᵃ disconnects the power from brush motor 183 thereby stopping its rotation. By this time the incoming roll is running at synchronous speed with the web, it is in the proper position with relation to the brush and the brush arm is in its operative position. As the running roll R diminishes in size, the operator stands in readiness to set off the pasting mechanism. When in his opinion the butt is almost exhausted "paste" button in station 225 is pressed closing contacts 112 and 192. Contact 192 may be traced through line 192ᵃ to a terminal 192ᵇ on the control board and from there to the "reel stop" contactor where it has been previously connected with terminal 191ᵇ. Terminal 191ᵃ may be traced to terminal 191ᵇ and also to one side of resistance 237, the other side of which is connected by contact 194 to one side of "brush hold-in" coil 238, the other side of which is connected to line wire 190ᵃ. From terminal 191ᵇ lines 191ᵃ may be traced also, one each to terminal of brush solenoid 145 and measuring relay solenoid 239 the other sides of which are connected to line wire 190ᵃ. Returning now to "paste" button in station 225 contact 112 may be traced to terminal 112ᵇ on the control board and from there to brush 112ᶜ bearing against a ring 112ᵈ of commutator 111. From ring 112ᵈ there is a jumper across to a small live segment 240 which during each revolution of commutator 111 passes under line wire brush 104ᶜ. Thus the very first time brush 104ᶜ contacts live segment 240 after the "paste" button has been pressed a circuit is established through 104, live contact 240, commutator ring 112ᵈ, brush 112ᶜ to terminal 112ᵇ through "paste" button in station 225 to contact 192 to terminal 192ᵇ and from there through "reel stop" contactor to contact 191 which goes to terminal 191ᵇ and there divides to energize brush solenoid 145, measuring relay solenoid 239 and "brush hold-in" coil 238. Thus simultaneously brush latch 147 is released so that pasting brush 21 presses the running web against the incoming roll, measuring relay solenoid 239 is operated to start measuring relay 189 in operation, as is fully described in said application Serial No. 591,077, Patent No. 2,048,767, and "brush hold-in" coil 238 is energized to close contacts 104 and 192. Since contact 104 is one side of the line it is apparent that its closure with 192 establishes a hold-in circuit through "reel stop" contactor to contact 191 and thereby sustains the power on brush arm solenoid 145, measuring relay solenoid 239 and brush hold-in coil 238.

The operation of measuring relay solenoid 239 withdraws plunger rod 248 allowing the drum of the measuring relay to rotate in direct proportion to the speed of the press. This occurs, of course, the instant the pasting brush 21 is dropped. After a predetermined length of paper has been measured off, that is, sufficient for the pasted points of the incoming roll to be surely attached to the running web, a live contact segment 190ᶜ passes under the brush contact 195ᶜ of the measuring relay which may be found by tracing wire 195ᵃ to run to terminal 195ᵇ on the control board and from there to one side of knife solenoid 144 the other side of which is connected to line wire 104ᵃ. This energizes knife solenoid 144 which lifts rod 154 permitting knife 24 to rotate into the web to sever it. As the measuring relay continues to rotate, another small live segment 190 passes under brush 196 which may be traced by wire 196ᵃ to terminal 196ᵇ on the control board. From there it divides, one wire running to a normally open movable contact on the "raise" contactor of the control board. A second wire 196ᵃ may be traced to multiple switch 188 where it terminates in contact 196 of the "raise stop" limit. With the arm lowered this switch is closed connecting contact 196 with contact 198 which latter may be traced through line 198ᵃ to terminal 198ᵇ on the control board and from there to one side of "raise" contactor coil 241, the other side of which is connected to contact 218 which, through the contact of thermal relay 227, is connected to line wire 104ᵃ. This series of connections energizes coil 241 closing contacts 190 and 210, 190 and 196, opening contacts 210 and 216. The closure of contacts 190 and 196 acts as a hold-in circuit for the coil 241 which may be traced to terminal 196ᵇ through wire 196ᵃ to "raise stop" limit in the multiple switch 188 where it connects with contact 198 which returns to terminal 198ᵇ and from there to one side of contactor coil 241. Thus, once the contact is made through brush 196 on measuring relay 189, it is held in as described. The connection of line wire 190 to 210 may be traced through terminal 210ᵇ to one side of brush arm motor 183 the other side of the motor contact 209 may be traced to terminal 209ᵇ thence to the middle of lower contactor where it connects with contact 217 and from there to one side of resistance coil 242, the other side of which is connected to contact 215 and from there to thermal relay 227, the other side of which is connected to contact 208 which runs to terminal 208ᵇ and thence to one side of the series field 231 of the brush arm motor, the other side of which is connected to line wire 104ᵃ. This establishes a circuit which causes motor 183 to revolve in such a direction that the brush arm is moved from operative to inoperative position. It will be noticed that in station 225 an alternate means for raising the brush arm is provided by a "raise" button whereby the pressing of this button will connect line wire 190ᵃ with contact 196 which runs to terminal 196ᵇ and in the same manner as described will energize coil 241 to cause motor 183 to rotate and raise the brush arm. As the brush arm is raised "forward reset" switch in multiple switch 188 closes contacts 104 and 193, the latter of which may be traced through line 193ᵃ to a terminal 193ᵇ and from there to the "reel operated" contactor on the control board where it connects with contact 204 which latter connects through wire 204ᵃ to terminal 204ᵇ and from there to one side of forward reel operating coil 234, the other side of whch is connected to line wire 190ᵃ. This series of connections energizes coil 234 closing contacts 219 and 104, 220 and 190 which causes reel motor 9 to operate to move the newly spliced roll toward the tension straps 13. As the reel moves forward projection 114 passes from underneath the roller of "paste position" switch 130 thereby permitting contacts 190 and 214 to be disconnected. This deenergizes "reel stop" coil 235, as will be seen by tracing contact 214 through wire 214ᵃ to terminal 214ᵇ, and from there to one side of reel stop coil 235. The deenergizing of coil 235 causes contacts 192 and 191 to be opened and contacts 193 and 194 to be closed. Opening of contacts 192 and 191 deenergizes brush solenoid 145, measuring relay solenoid 239 and "brush hold-in" coil 238, since it is apparent that the feed line for these three coils is provided through contact 104 on the "brush hold-in" contactor to contact 192 and from there through the "reel stop" contactor to contact 191, the latter of which constitutes the feed to one side of these three above named coils. The rotation of the reel continues until "tension position" switch 233 is opened by cam projection 243 carried on the reel proper thereby disconnecting contacts 190 and 212, the latter of which may be traced to terminal 212ᵇ on the control board and from there to contact 212 of the "reel operation" contactor where it is connected to contact 211 to establish a circuit for reel operation coil 232, the other side of which is connected to line wire 104ᵃ. This deenergizes "reel operation" coil 232 since as the brush arm was being raised contact 211 which goes to terminal 211ᵇ on one side of the "reel operation" switch in multiple switch 188 has been previously disconnected from line wire 190ᵃ. From the consequent opening of contacts 193 and 204, the latter of which goes to one side of forward operating coil 234, the former of which goes through a stationary contact on "reel stop" contactor to line contact 104, it is apparent that the forward rotation of the reel will be stopped by the deenergizing of coil 234. As the brush arm rises, the contact arm of rheostat 187 rotates in a clockwise direction and reduces the voltage on magnetic clutch 87 until such time as, in the rising of the brush arm, the "magnetic clutch" switch in multiple switch 188 opens contacts 190 and 197. This deenergizes magnetic clutch 87 as is apparent by tracing line 197ᵃ from the magnetic clutch switch to terminal 197ᵇ on the control board and from there to contact 197 of the rheostat arm through rheostat 187 to contact 105 and from there to terminal 105ᵇ on the control board from where it goes to brush 105ᶜ contacting selector ring 105ᵈ of commutator 78 and from there to one side of the magnetic clutch 87, the other side of which is connected through brush 104ᶜ to line wire 104ᵃ. This therefore discontinues control of the roll by magnetic clutch 87 which has already passed into contact with tension straps 13 and which thereafter provide normal running tension. Brush arm motor 183 continues to rotate, raising brush arm 23 until such time as "raise stop" switch in multiple switch 188 breaks contacts 196 and 198 the former of which may be traced to terminal 199ᵇ and from there to line contact 190 of the "raise" contactor, the latter of which may be traced to terminal 198ᵇ and from there to one side of "raise" contactor coil 241. The deenergizing of this coil opens contacts 190 and 210 and through the series of connections to brush arm motor 183 previously described removes power from that motor ceasing its rotation. It will be understood, of course, that when the brush arm reaches this raised position, "reel safety" switch in multiple switch 188 has remade contacts 104 and 201 to permit forward or reverse rotation of the reel motor by "forward" and "reverse" push buttons in stations 226 and that the "lower stop switch" in multiple switch 188 has remade contacts 199 and 200 such that at the proper time the cycle of pasting may be repeated.

As the drum of the measuring relay continues to rotate, a V-shaped live segment 190 passes under brush 203ᶜ connecting it therewith, which latter connection may be traced to terminal 203ᵇ on the control board and from there to one side of kicker solenoid 244, the other side of which is connected to line wire 104ᵃ. This causes kicker 245 to operate as described in application, Serial No. 591,077, Patent No. 2,048,767, to displace the spoiled papers on the delivery.

Connected in parallel with kicker solenoid 244 is signal light 246 which is illuminated at the time that the kicker operates to notify operators in the delivery and mailing rooms that a paster has been made. When the measuring relay makes one complete revolution, a projecting pin 247 comes in contact with solenoid rod 248 and stops the measuring relay drum preparatory to another cycle of pasting. The function of "roll brake" coil 249 is similar to that described in said application, Serial No. 591,077, Patent No. 2,048,767, and is operated at full voltage when a red button stop is used. When red button stops are made it is common practice to employ cylinder brakes which are energized to retard the rotation of the press.

After splicing, the new roll, which then becomes the running roll, is moved into contact with the tension straps but while the roll is of large size it is not carried into the straps far enough to have roller 71 move up the incline B on cam 73 as shown in Fig. 3. The roll is used in this position until it is substantially half used up. After this time it is moved down to the running position of the butt as shown by roll R in Fig. 1. This means that clutch parts 58 and 45 are engaged while the roll is still large and that any engagement of the magnetic clutch acts on the roll to assist in slowing it down for an emergency stop. It is, of course, apparent that incline B may be moved in a counterclockwise direction as shown in Fig. 3 to any desired point within certain limits. By connecting lines 206ᵃ and 207ᵃ across the cylinder brake roll, "brake coil" 249 is energized when the cylinder brakes are energized. This closes contacts 105 and 190. Contact 190 is one side of the power while contact 105 may be traced to terminal 105ᵇ and from there through wire 105ᵃ to brush 105ᶜ bearing against a selector ring of comutator 78 where it connects one side of the power to magnetic clutch 87, the other side being normally connected to line wire 104ᵃ. In this manner magnetic clutch 87 is energized to assist in retarding a large paper roll when an emergency stop of the press is made.

Although I have illustrated and described only one form of the invention I am aware of the fact that modifications can be made therein by any person skilled in the art without departing from the scope of the invention as expressed in the claims. Therefore, I do not wish to be limited in this respect otherwise than as set forth in the claims, but what I claim is:

1. In a roll rotating device for a web splicing machine, the combination of a web roll support, a shaft connected for driving a fresh web roll on said support through the axis of said roll, means whereby the shaft will be rotated from a source of power, a clutch on the spindle of said web roll, and means for selectively disengaging the particular clutch which is carried on the spindle of the incoming roll, so that the spindle is disconnected from the first named shaft as the incoming roll moves into running position after splicing.

2. In a web roll rotating device for a web splicing machine, the combination with a web roll support having means for supporting a plurality of web rolls thereon, its shaft, and means for operating the shaft to rotate the support, of a series of roll spindle shafts on the support, a gear loose on each spindle shaft, means for driving said several gears constantly, a clutch for connecting each gear independently with its spindle shaft, a lever for operating the clutch, and a stationary cam for disengaging each clutch by means of its lever whenever the support reaches a position in which the fresh roll carried by the spindle has been pasted to the web and is about to move into running position.

3. In a web splicing mechanism, the combination with a reel and its central supporting shaft, of roll spindle shafts carried by said reel, a variable speed mechanism, a radial shaft common to the several spindle shafts, means for driving any one of said spindle shafts from the last named shaft, means for connecting the last named shaft so that it will be driven by the variable speed mechanism, and bevel gears at the end of said radial shaft, said radial shaft being located at the end of the reel, whereby said bevel gears will not be forced out of mesh by the central shaft of the reel sagging under a heavy load.

4. In a web splicing mechanism, the combination with a reel and its central supporting shaft, of roll spindle shafts carried by said reel, a variable speed mechanism, a shaft common to the several spindle shafts, means for driving any one of said spindle shafts from the first named shaft, means for clutching the first named shaft so that it will be driven by the variable speed mechanism, and means operated by the reel for disengaging any one of said spindle shafts from its source of power when the reel, during its rotation, reaches a certain point.

5. In a roll rotating device for a web splicing machine, the combination of a variable speed mechanism, a press shaft for driving the variable speed mechanism, a shaft connected for driving the fresh web roll through the axis of said roll, a gear loose on the last named shaft, means for driving said gear from the variable speed mechanism, a magnetic clutch fast on the last named shaft, and means whereby, when said clutch is energized, the shaft will be rotated from the variable speed mechanism.

6. In a web splicing machine, the combination with a reel having means for supporting a fresh and a running web roll, of a variable speed device for rotating the fresh web roll on the reel, a measuring member for controlling the speed of the variable speed device, said measuring member being operated and controlled by the surface of the fresh web roll as it is moved with the reel, a projection on the reel, a paste position switch in position to be operated by said projection as it moves with the reel to a certain point, and means operated by said switch for stopping the reel at such a point that the fresh web roll will be left in pasting position.

7. In a web splicing mechanism, the combination with a swinging arm, a pair of electric contacts associated with said arm in position to be opened when the arm is in operative position, a web roll reel, a motor for operating the reel forward or back, a coil for reversing the motor to run the reel backward, said pair of contacts and another pair of contacts being in the motor circuit in series, and means whereby it is impossible to run the reel backward by closing the second pair of contacts when the arm is in operative position.

8. In a web splicing mechanism, the combination with a swinging arm, electric contacts associated with said arm in position to be opened when the arm is in operative position, a web roll reel, a motor for operating the reel forward or back, a coil for operating the motor to run the reel forward, said contacts and another pair of contacts being in the motor circuit in series, whereby it is impossible to run the reel forward by closing the second pair of contacts when the arm is in operative position.

9. In a roll rotating device for a web splicing machine, the combination of a rotary web roll support having a plurality of roll spindle shafts, a gear loose on each of said roll spindle shafts, means for driving said gears, a clutch between the roll spindle shaft and the last named gear for connecting them, a latch connected with each clutch, means for normally holding said latch in position to prevent the connection of the clutch, yielding means for tending to close said latter clutch, and a stationary cam in position to release the latch as the web roll support rotates.

10. In a web splicing device, the combination with an oscillatable arm, means supported by said arm for moving the running web into contact with the fresh web roll for performing the splicing operation, a pivoted frame carried by said arm on which the said pressing device is carried, a rod pivotally connected with said frame for operating it, a latch adapted to engage said rod and hold it in such position that the frame will be held in inoperative condition, a tension device for normally holding said latch closed, the end of said rod projecting to a position where it can be operated to depress the rod, and a spring for holding the rod normally in position to keep the said pivoted frame in operative position.

11. The combination of a rotary reel having a central shaft and provided with a fixed cam concentric with said shaft and having a low point, a web roll spindle shaft on the reel, means operated by the cam for connecting the spindle shaft with a source of power, a cover mounted on the reel and having an opening, and a latch connected with said means and entering said opening for holding the clutch open under certain conditions.

12. In a web splicing device, the combination of a central supporting shaft, a web roll supporting reel on the shaft, a spindle shaft, a gear loose on the spindle shaft, means for driving the gear, a clutch for clutching the last named gear to the spindle shaft, and means rotatable with the reel for throwing out the clutch at a definite point in the rotation of the reel.

13. In a web splicing mechanism, a rotatable magazine reel adapted to support a plurality of web rolls, chucks on the reel for mounting the web rolls, a common driving member, a selective clutch on one of each pair of chucks for connection to said common driving member, and a friction clutch for connecting said common driving member to a press-driven member.

14. In a web splicing mechanism, web-pressing means, a rotatable magazine reel for supporting a plurality of web rolls, chucks on the reel for mounting the web rolls, a common driving member, a one-point clutch on one of each pair of chucks for connection to said common driving member, and means connected with the common driving member for controlling the operation of the web-pressing means.

15. In a web splicing mechanism, web-pressing means, a rotatable magazine reel carrying a plurality of spindles for mounting web rolls, means for driving a fresh roll comprising a shaft, a single means, operated by said shaft, for controlling operation of the web-pressing means.

16. In a web splicing mechanism, a rotatable magazine reel having spiders for mounting a plurality of web rolls, a motor for rotating the reel, and means operated by one of the spiders for stopping the operation of the reel motor, said means being adapted to be preset from the surface of one of the web rolls.

17. In a web splicing mechanism, a rotatable magazine reel for mounting a plurality of web rolls, a motor for rotating the reel, a fresh roll on the reel, means for driving the fresh roll through its central axis, means for regulating the speed ratio of the fresh roll driving means with respect to the speed of a web on the running roll from the surface of the fresh roll, and means operated by the regulating means for stopping the reel motor.

18. In a web splicing device, the combination with a rotary web roll reel and a stationary guide, of a non-rotatable housing engaging said guide and movable therealong, said reel comprising a spider movable with the housing and rotatable, a driven shaft in stationary bearings, a shaft carried by the housing, means for transmitting power from the first shaft to the second in all positions of the housing, and means for transmitting power from the second shaft to rotate a roll on the reel.

19. In a web splicing device, the combination with a printing press frame and a rotary reel for carrying the web rolls, of a guide rail on the printing press frame, a housing on the reel, supported thereby but not rotatable therewith, having means for engaging said rail to guide it to move therealong, a shaft carried adjacent to said rail by the frame, means on the press for rotating said shaft, a plurality of web roll spindles carried by the reel, and means operated by said shaft for transmitting its rotation to a spindle to rotate the fresh web roll thereon.

20. The combination with a printing press and a web splicing device therefor, of a guide rail carried by the printing press, a rotary shaft, a pair of spiders longitudinally adjustable on said shaft and constituting therewith a reel for supporting a plurality of web rolls, a housing supported by said shaft and having a track thereon for engaging said rail located above the spider, a shaft supported by the printing press frame, means for driving said press frame shaft from the printing press, a shaft carried by the housing, means movable with the spider for transmitting the rotation of the second-named shaft to the third, and means operated by the third shaft and supported by the spider for rotating a fresh web roll carried by the spider.

21. In a web splicing device, the combination of a rotatable reel, means on the reel for supporting a web roll, a movable member adapted to engage the surface of the roll and be supported thereby as the web roll moves around on its reel so that said means will be held at a distance from the center of the roll equal to the radius of the roll, a movable switch, means for moving the switch by the operation of said member, and means controlled by said switch for stopping the motion of said reel in proper position for splicing, said position being controlled by the diameter of the said roll.

22. The combination with a roll supporting reel for a web splicing device having means for bodily moving the fresh roll, of a frame carrying means for pressing the running web against the fresh web roll, a member adapted to rest against the fresh web roll as it moves, and a switch automatically movable toward and away from the web, controlled by said member in accordance with the diameter of the web roll.

23. In a web splicing mechanism, the combination with a web roll and means for rotating the roll on its own axis, comprising a variable speed device connected to receive its power from a printing press, of means controlled by the diameter of the fresh web roll for transmitting power from a printing press through the variable speed device at different rates of speed, a magnetic clutch for receiving power from the variable speed device, means for deenergizing the magnetic clutch, a gear train for transmitting a motion of rotation from the magnetic clutch to the axis of said roll, and means whereby when the clutch is energized, the train of gears to the roll can be operated mechanically to prevent transmission of a motion of rotation to said roll.

24. In a web splicing mechanism, the combination with a reel movable to carry a fresh web roll through a definite path and means for rotating it on its own axis, of a variable speed device, means controlled by the diameter of the fresh web roll for transmitting power from the variable speed device at different rates of speed, a magnetic clutch for receiving power from the variable speed device, means for deenergizing the magnetic clutch, means for transmitting a motion of rotation from the magnetic clutch to said roll, and means whereby, when the clutch is in operation, said transmitting means can be disconnected mechanically to prevent the transmission of a motion of rotation to said roll.

HENRY A. WISE WOOD.

CERTIFICATE OF CORRECTION.

Patent No. 2,148,094.　　　　　　　　　　　　　　February 21, 1939.

It is hereby certified that error appears in the above numbered patent requiring correction as follows: In the grant, line 2, the name of the inventor was erroneously written as "HARRY A. WISE WOOD" whereas said name should have been written as HENRY A. WISE WOOD, as shown by the records of this office; and that the said Letters Patent should be read with this correction therein that the same may conform to the record of the case in the Patent Office.

Signed and sealed this 11th day of April, A. D. 1939.

Henry Van Arsdale (Seal)　　　　　　　　　　　　　　　　Acting Commissioner of Patents.